(12) United States Patent
Meyers et al.

(10) Patent No.: US 11,862,350 B2
(45) Date of Patent: Jan. 2, 2024

(54) NUCLEAR MOVABLE ELEMENT POSITION INDICATION APPARATUS, SYSTEM, AND METHOD

(71) Applicant: Westinghouse Electric Company LLC, Cranberry Township, PA (US)

(72) Inventors: Timothy S. Meyers, Finleyville, PA (US); Steve E. Czwalga, Wexford, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 33 days.

(21) Appl. No.: 17/155,807

(22) Filed: Jan. 22, 2021

(65) Prior Publication Data
US 2022/0238242 A1     Jul. 28, 2022

(51) Int. Cl.
*G21C 7/36*     (2006.01)
*G21C 17/12*    (2006.01)
(Continued)

(52) U.S. Cl.
CPC .............. *G21C 17/12* (2013.01); *G21C 7/08* (2013.01); *G21C 7/36* (2013.01); *G21C 7/12* (2013.01); *G21D 3/001* (2013.01)

(58) Field of Classification Search
CPC .......... G21C 17/12; G21C 17/10; G21C 7/36
See application file for complete search history.

(56) References Cited

U.S. PATENT DOCUMENTS 3,154,946 A * 11/1964 Ordorica ................. G01F 23/62
                                                          73/319
3,846,771 A    11/1974 Young et al.
(Continued)

FOREIGN PATENT DOCUMENTS

| JP | H07209477 A | 8/1995 |
| JP | 08240692 A * | 9/1996 |
| TW | I334610 B | 12/2010 |

OTHER PUBLICATIONS

International Search Report and Written Opinion for corresponding International PCT Application No. PCT/US2022/070305, dated Sep. 29, 2022.

(Continued)

*Primary Examiner* — Lily C Garner
(74) *Attorney, Agent, or Firm* — K&L Gates LLP

(57) ABSTRACT

Disclosed is an apparatus, system, and method for monitoring a position of a control rod disposed in a nuclear reactor vessel in a radioactive environment. A data processing unit located outside a containment structure includes a processor and a memory storing executable instructions. A nuclear reactor vessel includes a plurality of control rods proximate to the control rod and a coil stack of a plurality of control rod position indicator coils. A data cabinet mounted on the nuclear reactor vessel head inside the containment structure includes an analog multiplexer and a communication circuit. The processor executes the instructions to select a control rod position indicator coil through the analog multiplexer, pass a signal from the control rod position indicator coil through the analog multiplexer, receive the signal from the analog multiplexer through the communication circuit, and determine a position of the control rod based on the received signal.

21 Claims, 9 Drawing Sheets

(51) Int. Cl.
*G21C 7/08* (2006.01)
*G21D 3/00* (2006.01)
*G21C 7/12* (2006.01)

(56) References Cited

U.S. PATENT DOCUMENTS

| | | | | |
|---|---|---|---|---|
| 3,858,191 | A | * | 12/1974 | Neuner .................. G21C 17/12 976/DIG. 242 |
| 3,893,090 | A | | 7/1975 | Neuner et al. |
| 4,668,465 | A | * | 5/1987 | Boomgaard ........... G21C 17/12 976/DIG. 242 |
| 5,408,508 | A | | 4/1995 | Federico et al. |
| 8,442,180 | B2 | | 5/2013 | Nakamura et al. |
| 8,599,987 | B2 | | 12/2013 | Morris |
| 10,020,081 | B2 | | 7/2018 | Carvajal et al. |
| 11,069,450 | B2 | * | 7/2021 | Clarkson .................. G21D 3/04 |
| 2011/0085633 | A1 | | 4/2011 | Morris |
| 2013/0142298 | A1 | * | 6/2013 | Nakanosono ........ G21C 17/108 376/259 |
| 2015/0348656 | A1 | * | 12/2015 | Kono ........................ G01T 3/00 376/254 |
| 2017/0206990 | A1 | | 7/2017 | Carvajal et al. |
| 2017/0352440 | A1 | | 12/2017 | Morton et al. |

OTHER PUBLICATIONS

Search Report in corresponding Taiwanese Application No. 111102789; dated Jun. 20, 2023.

* cited by examiner

NUCLEAR MOVABLE ELEMENT POSITION INDICATION APPARATUS, SYSTEM, AND METHOD

TECHNICAL FIELD

The present disclosure is directed to a system for monitoring the position of a movable element in a nuclear reactor vessel. More particularly, the present disclosure is directed to a system for monitoring the position of a control rod in a nuclear reactor vessel.

BACKGROUND

The mechanical movement (i.e., insertion, withdrawal) and the associated monitoring of the position of movable elements, such as control rods, in a nuclear reactor vessel 8 are necessary functions for the operation of a nuclear reactor. Each of the instruments that perform this function typically is terminated with a power cable 17 and one or two position indication cables that transmit signals from the instrument back to processing units, where Analog Rod Position Indication (ARPI) systems are located outside the containment structure and Digital Rod Position Indication (DRPI) systems are located in data cabinets inside the containment structure as significant distance away from the reactor vessel head 12. As used herein, the term instrument may also include a sensor or sensing device. Known rod position indicator cable systems, such as the one depicted in FIGS. 1 and 2, typically include multi pin connector disconnect points 10 located at the top of the nuclear reactor vessel head 12 and at the reactor cavity wall 14 poolside. Additional disconnect points 10 may also be located at other points between the vessel head 12 and the cavity wall 14. The multi pin connector disconnect points 10 allow each of the interconnecting cable sections 16 to be removed from corresponding sensing instruments 18 to allow for the disassembly of the reactor vessel 8 for refueling. The typical reactor vessel 8 includes on the order of magnitude of 100 or more of these cable assemblies.

The removal and installation of the cable sections 16 is generally part of the "critical path" schedule for a refueling outage and generally requires the services of a specially trained crew of technicians during both the initial and concluding stages of the refueling outage in order to complete the work. Typically, such work can take up to an entire shift to complete. In total, the manipulation of the signal cable sections 16 may occupy an entire day of a 30 day outage. Although disconnecting cables adds time, it is more costly to perform checks and calibrating the ARPI systems in mode 3 as this calibration and soak can take up to 12 hours. Given the high per hour cost of lost critical path time, this one day period would represent a very high cost per refueling outage without even taking into consideration the cost of the trained work crew.

Additionally, the repeated manipulation of the signal cables increases the potential for damage, leading to the need to repair and/or replace the cables and/or the related hardware. Furthermore, the manipulation of the signal cables must be carried out in a radiation area located above the reactor vessel. Elimination of this work scope would thus eliminate the radiation exposure associated with this work activity.

Certain nuclear power plants with ARPI systems experience numerous issues with system (drift, cross talk, multiple single points of failures) and spend hundreds of hours per cycle maintaining the ARPI system. The ARPI system is critical path during startup for up to 12-18 hours. Although DRPI systems may be installed to resolve most ARPI system issues, there is no inexpensive way to upgrade DRPI systems.

Virtually all nuclear power plants with Rod Position Indication (RPI) experience numerous cable connection issues as these are disconnected and connected every outage. Testing must be performed after the cables are re-connected to validate the cable, which takes time. Testing also puts wear on the cables and causes a need for the cables to be replaced every 20-25 years. Subject Matter Experts (SMEs) are required to troubleshoot complex systems and numerous issues.

Currently, the electronics for DRPI systems are located approximately an average of 100-125 ft. away from the nuclear reactor vessel head 12 in the containment area such that during every outage the cables have to disconnected and reconnected, which requires time and effort and could lead to error during reconnection. Currently there are 29-61 rods in active nuclear reactors and 69 rods in next generation reactors.

Accordingly, there exists an opportunity for improvement in nuclear rod position indication systems for monitoring the position of the control rods and other reactor conditions.

SUMMARY

In one aspect, the present disclosure provides a method of monitoring a position of a control rod disposed in a nuclear reactor vessel disposed in a radioactive environment. The method comprises (a) selecting, by a processor located outside a containment structure, a control rod position indicator coil arranged in a coil stack through an analog multiplexer located in a data cabinet mounted on a nuclear reactor vessel head inside the containment structure, wherein the coil stack is located proximate to a control rod disposed in the nuclear reactor vessel; (b) passing, through the analog multiplexer, a signal from the control rod position indicator coil; (c) receiving, by the processor, the signal from the analog multiplexer through a communication circuit located in the data cabinet mounted on the nuclear reactor vessel head inside the containment structure; and (d) determining, by the processor, a position of the control rod based on the received signal.

In another aspect, the present disclosure provides an apparatus for monitoring a position of a control rod disposed in a nuclear reactor vessel disposed in a radioactive environment. The apparatus comprises a processor coupled to a memory storing executable instructions, the processor located outside a containment structure; an analog multiplexer located in a data cabinet mounted on a nuclear reactor vessel head inside the containment structure; and a communication circuit coupled to the analog multiplexer and the processor. When executed by the processor the executable instructions cause the processor to: (a) select a control rod position indicator coil arranged in a coil stack through the analog multiplexer, wherein the coil stack is located proximate to a control rod disposed in the nuclear reactor vessel; (b) pass a signal from the control rod position indicator coil through the analog multiplexer; (c) receive the signal from the analog multiplexer through the communication circuit; and (d) determine a position of the control rod based on the received signal.

In yet another aspect, the present disclosure provides a system for monitoring a position of a control rod disposed in a nuclear reactor vessel disposed in a radioactive environment. The system comprises a data processing unit located outside a containment structure, the data processing unit comprising a processor coupled to a memory storing executable instructions; a nuclear reactor vessel located inside the containment structure; a plurality of control rods disposed in the nuclear reactor vessel; a coil stack comprising a plurality of control rod position indicator coils, wherein the coil stack is located proximate to the control rod disposed in the nuclear reactor vessel; a data cabinet mounted on the nuclear reactor vessel head inside the containment structure. The data cabinet comprises an analog multiplexer; and a communication circuit coupled to the analog multiplexer and the processor. When executed by the processor the executable instructions cause the processor to: (a) select a control rod position indicator coil arranged in a coil stack through the analog multiplexer; (b) pass a signal from the control rod position indicator coil through the analog multiplexer; (c) receive the signal from the analog multiplexer through the communication circuit; and (d) determine a position of the control rod based on the received signal.

BRIEF DESCRIPTION OF THE DRAWINGS

Various features of the embodiments described herein, together with advantages thereof, may be understood in accordance with the following description taken in conjunction with the accompanying drawings as follows.

FIG. 5A shows a multiplexer circuit located inside the containment structure according to at least one aspect of the present disclosure;

FIG. 5B shows a communication circuit coupled to the multiplexer circuit shown in FIG. 5A, where the communication circuit is located inside the containment structure, according to at least one aspect of the present disclosure; and FIG. 5C shows a computer circuit coupled to the communication circuit shown in FIG. 5B, where the computer circuit is located outside the containment structure, according to at least one aspect of the present disclosure.

Corresponding reference characters indicate corresponding parts throughout the several views. The exemplifications set out herein illustrate various embodiments of the invention, in one form, and such exemplifications are not to be construed as limiting the scope of the invention in any manner.

DESCRIPTION

Applicant of the present application owns the following U.S. Patents, the disclosure of each of which is herein incorporated by reference in its respective entirety:

U.S. Pat. No. 10,020,081, titled NUCLEAR CONTROL ROD POSITION INDICATION SYSTEM, filed Jan. 15, 2016;

U.S. Pat. No. 8,599,987, titled WIRELESS TRANSMISSION OF NUCLEAR INSTRUMENTATION SIGNALS, filed Oct. 13, 2009;

U.S. Pat. No. 3,893,090, titled POSITION INDICATION SYSTEM, filed Jan. 3, 1973; and U.S. Pat. No. 3,846,771, titled POSITION INDICATION SYSTEM, filed Jan. 3, 1973.

The present disclosure will now be described more fully hereinafter with reference to the accompanying drawings, in which examples of the present disclosure are shown. The present disclosure, however, be embodied in many different forms and should not be construed as limited to the examples set forth herein. Rather, these examples are provided for thoroughness and completeness, and will fully convey the scope of the present disclosure to those skilled in the art. Like numbers refer to like elements throughout.

Figure 3:
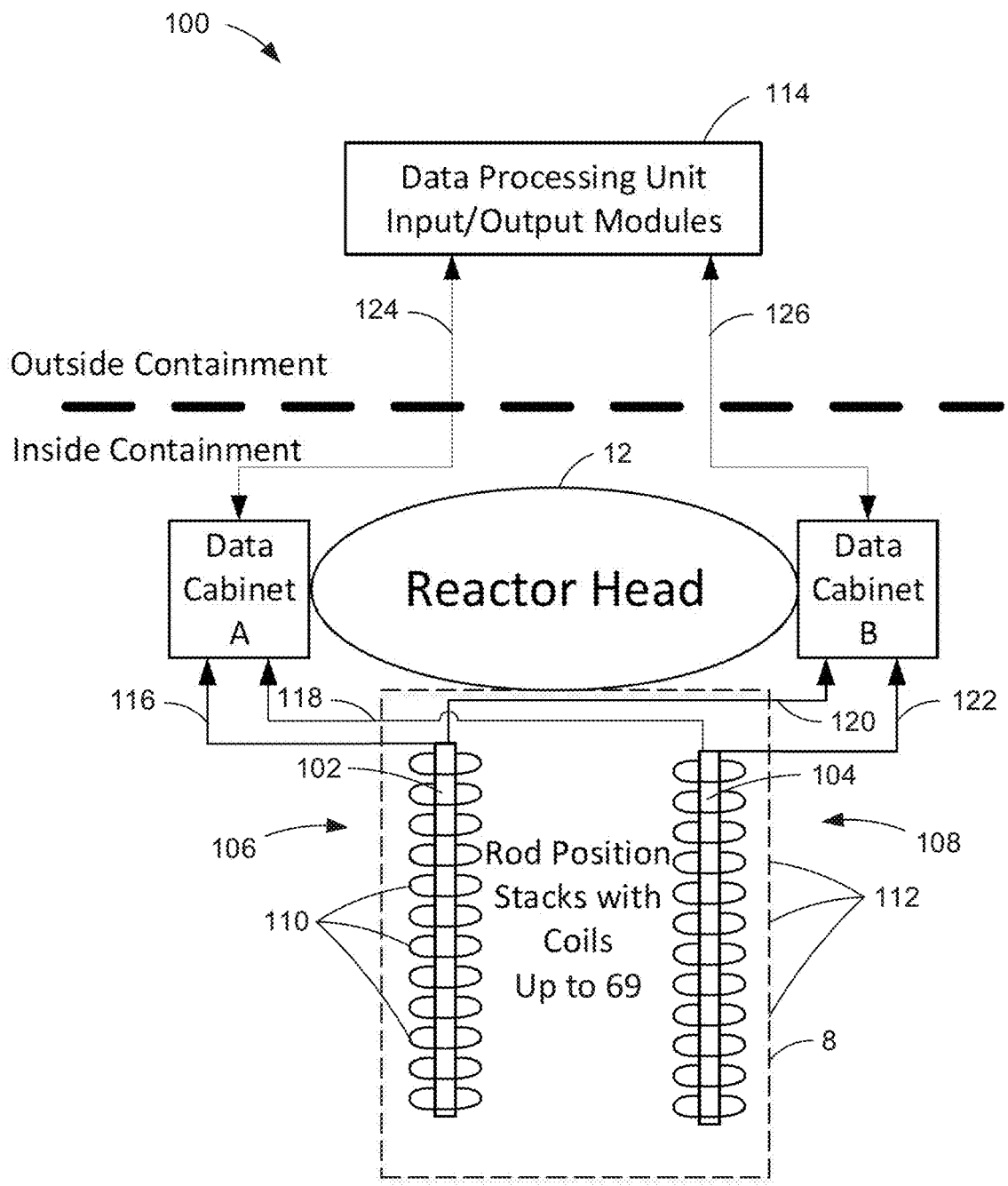
FIG. 3 shows a high level system for monitoring the position of a movable element in a nuclear reactor vessel according to at least one aspect of the present disclosure.

FIG. 3 shows a high level system 100 for monitoring the position of a movable element in a nuclear reactor vessel 8 according to at least one aspect of the present disclosure. The system 100 comprises electronic measurement circuits located in data cabinets A and B mounted on the reactor vessel head 12 within the containment structure. The electronic circuits located in the data cabinets A, B read the signals generated by sensors configured to monitor the position of a movable element within the nuclear reactor vessel 8. In the aspect illustrated in FIG. 3, the system 100 is configured to monitor the position of control rods 102, 104 located within the nuclear reactor vessel 8.

The system 100 illustrated in FIG. 3 includes a reactor vessel 8 that houses a nuclear core into which the control rods 102, 104 are inserted and withdrawn during a nuclear reaction. The control rods 102, 104 are typically connected together by a spider cluster assembly and driven into and out of the core by a drive rod that moves within a pressure housing in steps activated by a control rod drive mechanism. The position of the control rods 102, 104 relative to the core are determined by rod position by coil stacks 106, 108 each comprising a plurality of indicator control rod position indicator coils 110, 112. For conciseness and clarity of disclosure, only a single coil stack 106, 108 per control rod 102, 104 is shown in FIG. 3. In actual implementations, a coil stack comprises alternating A and B coils per control rod 102, 104 for redundancy.

Accordingly, a digital rod position indication system, such as the system 100 schematically illustrated in FIG. 3, includes coil stacks 106, 108 for each control rod 102, 104, respectively, and a digital rod position indication data processing unit 114 that receives signals from the data cabinets A, B. The data processing unit 114 processes the signals received from the coil stacks 106, 108 to determine the position of the control rods 102, 104. Each coil stack 106, 108 comprises an independent channel of control rod position indicator coils 110, 112 placed over the pressure housing. Each channel may include up to 24 control rod position indicator coils 110, 112. The control rod position indicator coils 110, 112 are interleaved and positioned at 3.75 inch (9.53 cm.) intervals (six steps), for example. The digital rod position indication electronics for each coil stack 106, 108 of each control rod 102, 104 are located in a pair of redundant data cabinets A, B mounted on the reactor vessel head 12.

Although intended to provide independent verification of the position of the control rods 102, 104, digital rod position indication systems are considered to be accurate within plus or minus 3.75 inches (9.53 cm.) (six steps) with both channels functioning and plus or minus 7.5 inches (19.1 cm.) using a single channel (twelve steps), for example. In contrast to conventional digital rod position indication systems, a conventional analog rod position indication system determines the position based on the amplitude of the AC output voltage of an electrical coil stack linear variable differential transformer. The overall accuracy of a properly calibrated analog rod position indication system is considered to be accurate within plus or minus 7.2 inches (18.3) (twelve steps), for example. Neither conventional analog rod position indication systems nor conventional digital rod position indication systems are capable of determining the actual positions of the control rods 102, 104. In a DRPI system, the position of the control rod 102, 104 is known when the DRPI transitions to each gray code.

It should be noted that for purposes of this application, the phrase "control rod" is used generally to refer to a unit for which separate axial position information is maintained, such as a group of control rods 102, 104 physically connected in a spider cluster assembly. The number of control rods 102, 104 varies according to the plant design. For example, a typical four-loop pressurized water reactor has fifty-three control rods 102, 104. Each control rod 102, 104 requires its own set of control rod position indicator coils 110, 112 having one or more channels and the digital rod position indication electronics associated with each channel in the case of digital systems. Thus, in a typical four-loop pressurized water reactor, the entire digital rod position indication system would include fifty-three coil stacks, each having two independent channels, and 106 digital rod position indication electronics units.

The voltages generated by each control rod position indicator coil 110, 112 configured to monitor the position of each control rod 102, 104 are transmitted over cables comprising multiple wires 116, 118, 120, 122. These voltages are passed through several layers of multiplexors in order to send the voltages outside of the containment structure over a single wire 124, 126 ignoring redundancy and two wires for redundancy. Current nuclear reactors include 29-61 control rods 102, 104 and next generation nuclear reactors will include up to 69 control rods 102, 104. Each control rod 102, 104 is stacked with a plurality of control rod position indicator coils 110, 112.

Figure 4:
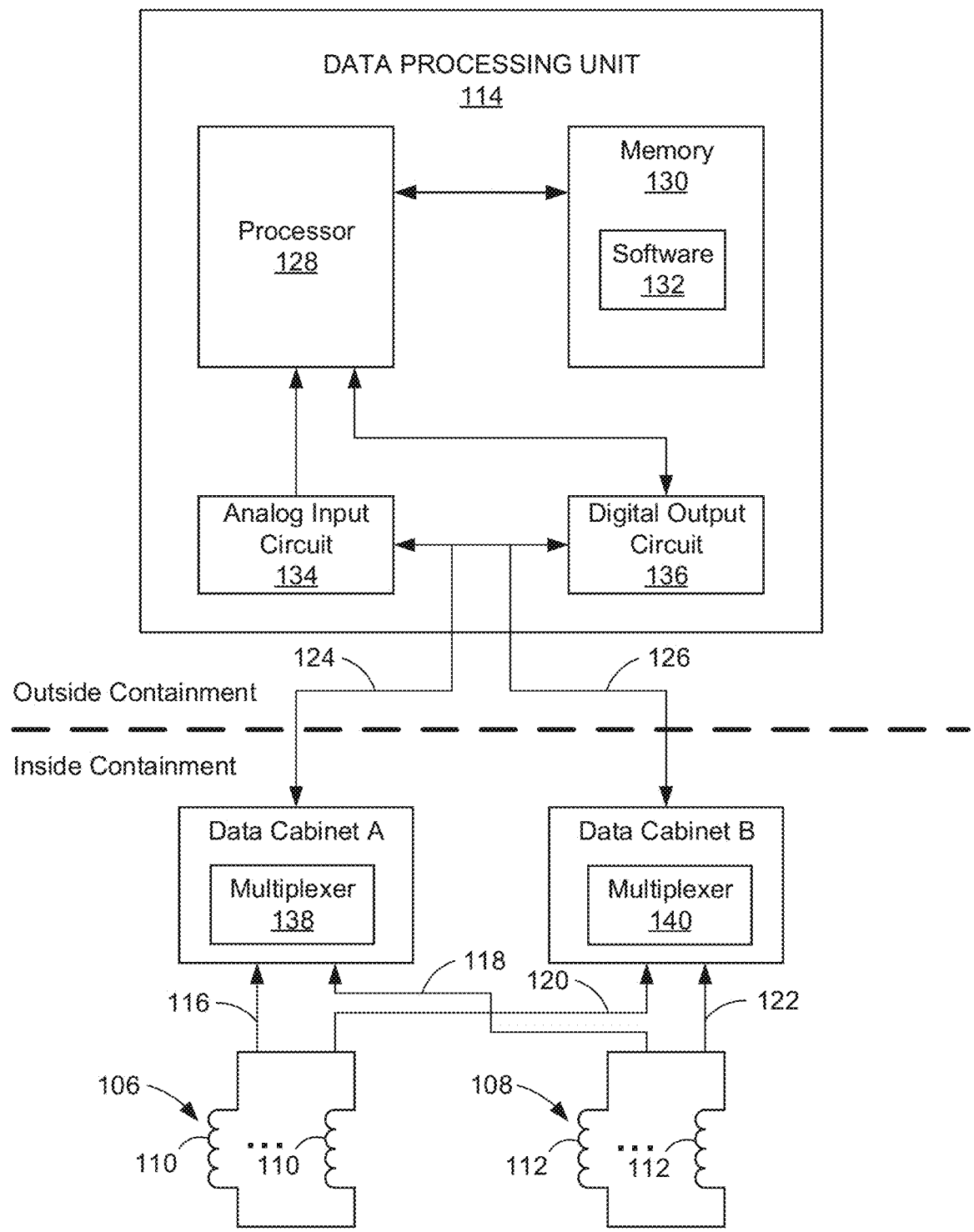
FIG. 4 shows a block diagram of an electrical circuit for the system for monitoring the position of a movable element in a nuclear reactor vessel shown in FIG. 3 according to at least one aspect of the present disclosure.

FIG. 4 shows a block diagram of a data processing unit 114 for the system 100 for monitoring the position of a movable element in a nuclear reactor vessel shown in FIG. 3 according to at least one aspect of the present disclosure. The data processing unit 114 comprises a logic processor 128 coupled to a memory 130 in which software instructions 132 are installed, an analog input circuit 134, and a digital output circuit 136. The digital output circuit 136 controls analog multiplexors 138, 140 in each the data cabinet A, B. Every control rod position indicator coil 110, 112 (FIG. 3) will have its own binary digital control number. When the digital output circuit 136 switches to a new address, the analog input circuit 134 reads the voltage. This will repeat until all control rod position indicator coils 110 in one coil stack 106 and all control rod position indicator coils 112 in another coil stack 108 are read. With this data the position of all control rods 102, 104 (FIG. 3) in the nuclear power plant can be determined. This process will continue on a loop indefinitely. The loop, however, may be modified to any combination including monitoring a single coil, which may be useful for control rod 102, 104 drop testing, for example.

With reference to FIGS. 3 and 4, in one aspect, the system 100 according to the present disclosure is configured to monitor the position of the control rods 102, 104 in a nuclear reactor vessel 8. In one aspect, the system 100 for monitoring a position of a control rod 102, 104 of a nuclear reactor vessel 8 comprises electronic circuits located in data cabinets A, B mounted directly on a nuclear reactor vessel head 12 inside the containment structure. During outages large cables comprising multiple wires 116, 118, 120, 122 going to control rod position indicator coils 110, 112 will no longer need to be disconnected, thus reducing wear on the cables and connectors and eliminating testing, which must be performed after the cables are re-connected to validate the cable, which saves time and radiation dose.

In one aspect, the present system 100 replaces the existing data cabinets A, B in the DRPI system with an updated electronic design. This enables the system 100 to be more flexible by allowing all indication and additional functions simply by having programmable software 132 in the data processing unit 114 located outside the containment structure. Existing DPRI systems accomplish control rod 102, 104 position by using an electrical/electronic hardware only approach. The hardware reads the voltages on the control rod position indicator coils 110, 112 and determines the position of each control rod 102, 104 via hardware only and then sends that data out to the display system. The system 100 according to at least one aspect of the present disclosure, however, is configured to read all the voltages on the control rod position indicator coils 110, 112 directly into a computer/processor 128 in the data processing unit 114 where the software 132 instructions are executed by the processor to determine the location of the control rods 102, 104 and to perform all other DRPI functions.

There are numerous advantages to the system 100 according to at least one aspect of the present disclosure. For example, if one control rod position indicator coil 110 in the coil stack 106 appears to develop more resistance over time than the other control rod position indicator coils 110 or connections in the coil stack 106, e.g., due to physical wear, the processor 128 can execute the software 132 instructions to adjust for the different and unexpected readings, whereas existing hardware only based DRPI systems are unable to make any adjustments in the positioning readings of the control rods 102, 104.

Additionally, in the system 100 according to at least one aspect of the present disclosure, the data cabinets A, B are mounted on the top of the reactor vessel head 12. The system 100 overcomes several challenges such as physical space limitations and operating in higher levels of radiation. Locating the data cabinets A, B with associated electronic circuits on top of the reactor vessel head 12 eliminates the need during outages to disconnect the DRPI stack cables comprising the multiple wires 116, 118, 120, 122 going to control rod position indicator coils 110, 112. This will save the nuclear power plant operator valuable outage time and financial resources, and will increase reliability.

Given the enhanced radiation environment, the electronic circuits, e.g., multiplexers and other active or passive electronic components, located in the data cabinets A, B include radiation hardened electronic components which may require radiation shielding to meet the necessary radiation and life expectancy requirements of the electronic circuits. Radiation testing proved that commercial off the shelf active electronic components were not viable for use on top of the reactor vessel head 12 even with reasonable levels of shielding. Some passive electrical components, such as capacitors, diodes, and resistors, can withstand the radiation levels needed without additional shielding. Accordingly, the electronic circuits located in the data cabinets A, B employ radiation hardened multiplexers and other active components.

Electronic Multiplexer Architecture

Figure 5A:
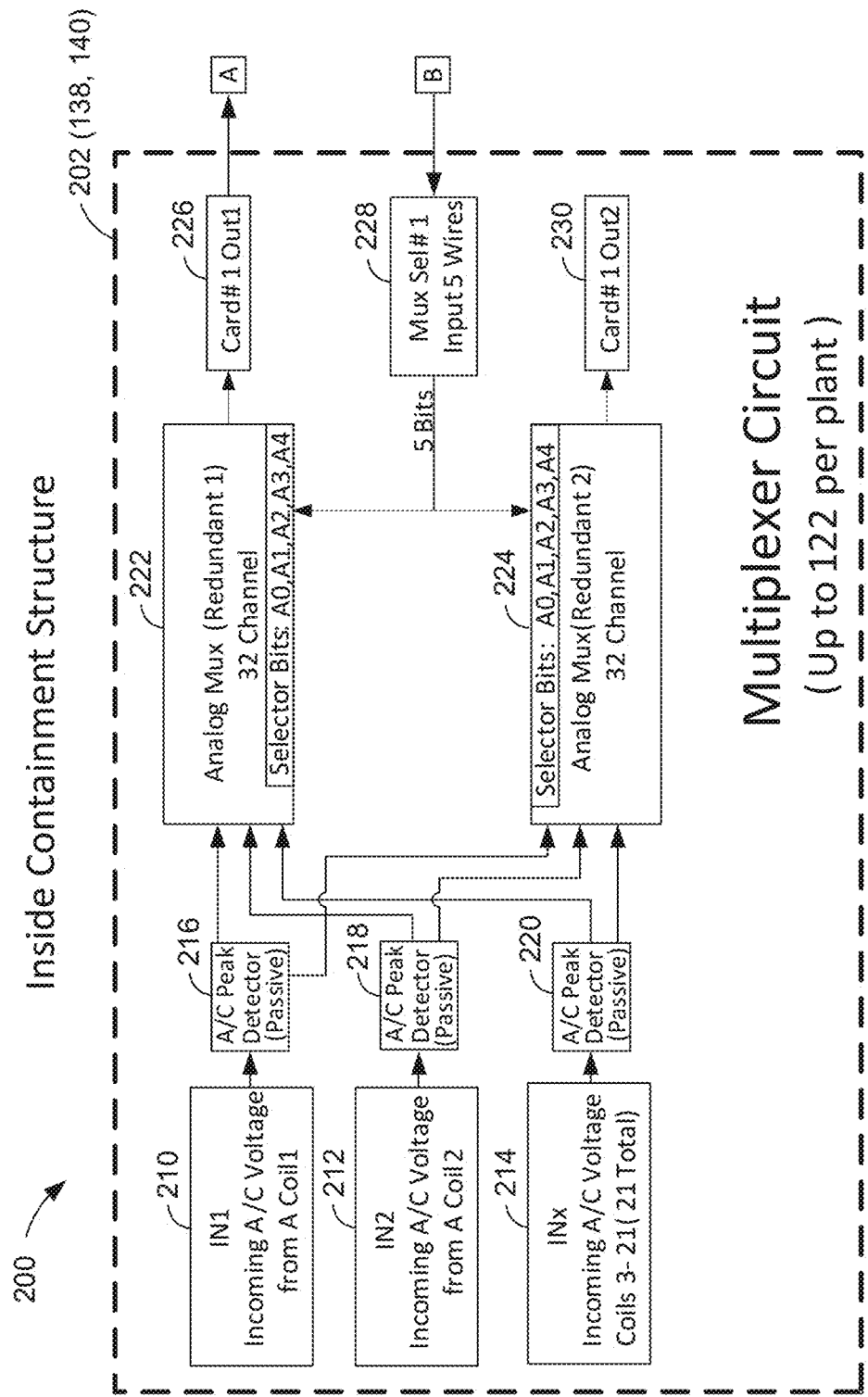
FIGS. 5A-5C show a high level multiplexer system broken into partial views over several sheets according to at least one aspect of the present disclosure, where.
Figure 5B:
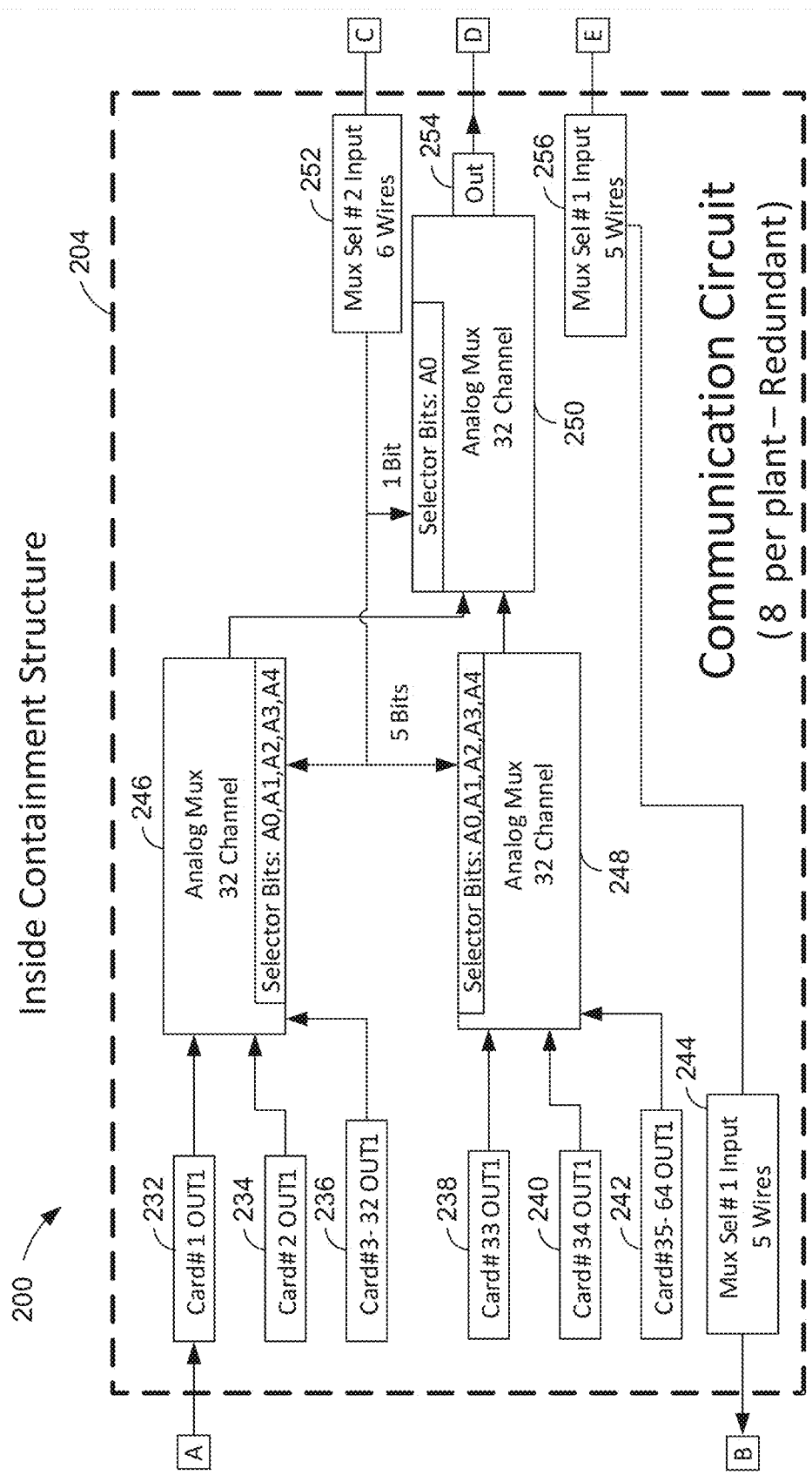
Figure 5C:
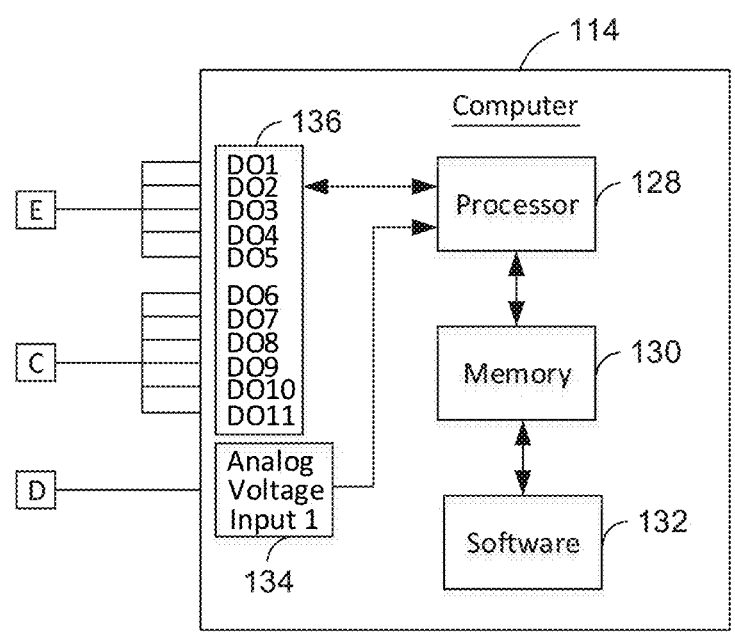

FIGS. 5A-5C show a high level multiplexer system 200 broken into partial views over several sheets according to at least one aspect of the present disclosure, where FIG. 5A shows a multiplexer circuit 202 located inside the containment structure, FIG. 5B shows a communication circuit 204 coupled to the multiplexer circuit 202 shown in FIG. 5A, where the communication circuit 204 is located inside the containment structure, and FIG. 5C shows a data processing unit 114 comprising a data acquisition computer system coupled to the communication circuit 202 shown in FIG. 5B, where the data processing unit 114 is located outside the containment structure. The multiplexer circuit 202 is a detailed implementation of the analog multiplexers 138, 140 shown in FIG. 4. The communication circuit 204 is contained in the data cabinets A, B shown in FIGS. 3 and 4. The processing unit is also shown in FIGS. 3 and 4. It will be appreciated that in one aspect, the high level multiplexer system 200 may include redundant controls for redundant components. In other aspects, the high level multiplexer system 200 may include the single control for primary and redundant components as illustrated in FIGS. 5A-5C, for example.

The multiplexer circuit 202 shown in FIG. 5A and the communication circuit 204 shown in FIG. 5B are located in the data cabinets A, B located on top of the reactor vessel head 12 (FIGS. 1, 3) inside the containment structure. These circuits 202, 204 each include radiation shielding and active components that are radiation hardened to, e.g., from 75 krad to over 125 krad TID based on construction.

The multiplexer circuit 202 is used to read all the coil voltages down to a single output and reading the entire system at a fast rate. The multiplexer circuit 202 comprises a first analog multiplexer 222 and a second analog multiplexer 224. Each of the first and second analog multiplexers 222, 224 are 32-to-1 channel multiplexers, for example, that are radiation hardened. One example of a radiation hardened 32-to-1 channel multiplexer integrated circuit is manufactured by Renesas/Intersil.

Although the analog coil voltages are sent over a long distance outside of the containment structure, there are several conditions to mitigate transmitting the analog coil voltage over a long distance. All coil voltages are transmitted over a single wire (ignoring A/B coils and redundancy). Any contact resistance, wire resistance, or other varying resistance over time will affect the coil voltages equally over the entire system 200. The actual coil voltages being read by the data acquisition system does not matter. They only matter as a percentage related to all other coil voltages within each DRPI stack. For example, if rod-in voltage is 1.60 v and rod-out voltage is 1.15 v under normal expected conditions the system is reading the 0.45 v delta between the coils. If there is any additional wire resistance causing the rod-in voltage being read to be 1.20 v and rod-out voltage being read to be 0.75 v, the system will still be able to see the voltage delta between.

Although there may be some resolution loss as the resistance increases, the system 200 will read the delta voltage properly unless the resistance approaches an open circuit. Such a dramatic resistance change would be a result of an installation or connection failure, which could happen under any system or design.

All wire and cable within a nuclear power plant could be subjected to some level of noise. Analog signals are generally more susceptible to noise since information is being passed in a small voltage or current level, where digital signals are relying on bits logic to send the information. In low voltage analog transmission, a change of 10 mV due to noise can cause drastic changes in the system. In this system 200, however, it would be unaffected due to the large voltage difference between rod-in and rod-out states. While the signals being sent are analog, it is very similar to a 0.45 v digital signal as there are only two states of information (rod-in/rod-out).

The multiplexer system 200 comprises an interface circuit (not shown), a multiplexer circuit 202, a communication circuit 204, and an AC transformer (not shown) located inside the containment structure. The data processing unit 114 comprises an analog input circuit 134 and a digital output circuit 136 located outside the containment structure. In one aspect, the circuits are implemented in a modular way to enable modifications of the metal enclosure to accommodate several sizes and layouts.

Interface Circuit

The interface circuit performs several functions. It contains the connectors used to connect to each DRPI coil. In one aspect, each interface circuit may be configured to connect to 4 DRPI stacks, for example. Four was chosen based on size, modular fit, and internal wiring connectors. Those skilled in the art will appreciate, however, that each interface circuit may be configured to connect to any number of DRPI stacks, e.g., 1-3 or more than 4. The interface circuit includes 5 ohm resistors required to be in series with each coil. In implementations that include 21 coils per coil stack, there are 21 resistors per coil stack and thus 84 resistors per interface card.

A connector is included to bring the 6 Vac needed to go out to the coils directly to the interface circuit (~40 Amps). There also will be two connectors (low voltage/low current) that send all coil position voltage from the interface circuit to the multiplexer circuit 202.

Multiplexer Circuit

With reference now to FIG. 5A, in one aspect, the multiplexer circuit 202 multiplexes all the coil voltages received from each DRPI coil stack and sends the voltages out to the communication circuit 204 shown in FIG. 5B. Like the interface circuit, in one aspect, each multiplexer circuit 202 will handle 4 DRPI coil stacks. Each interface circuit will connect to a multiplexer circuit 202 passing all the coil voltages of the 4 DRPI coil stacks in parallel wires. This connection is made by radiation tolerant ribbon cable, or other radiation tolerant wire to board connectors.

Figure 6:
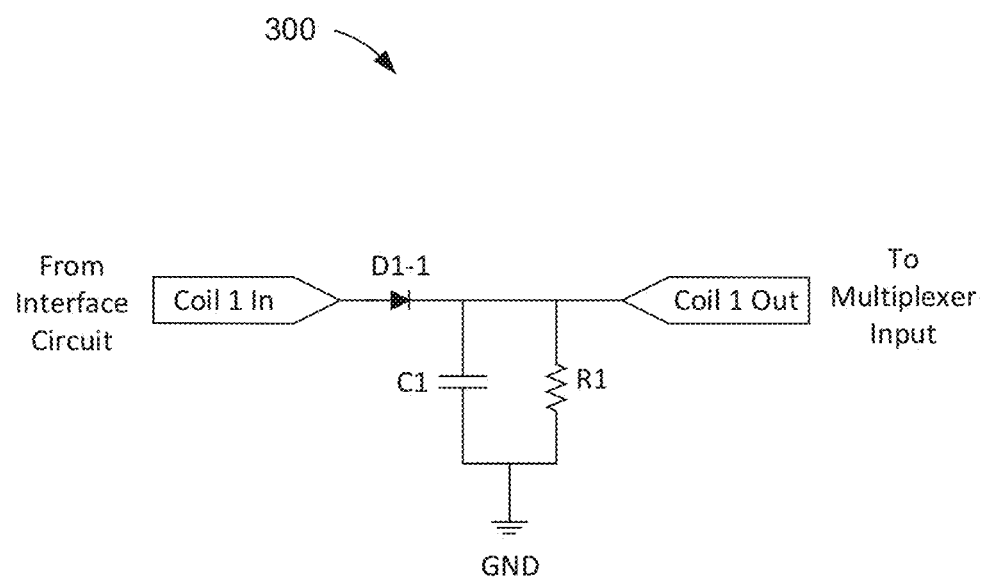
FIG. 6 shows a rectifier circuit for rectifying coil voltages according to at least one aspect of the present disclosure.

With continued reference to FIG. 5A, the inputs to the multiplexer circuit 202 are the incoming A/C voltages from 21 coils 210, 212, 214. Each of the received coil voltages 210, 212, 214 are applied to 21 separate A/C peak detector rectifiers 216, 218, 220, respectively. For conciseness and clarity of disclosure, the coil voltages 214 represent the individual coil voltage inputs form coils 3-21 and each of these coil voltages a re applied to individual A/C peak detector rectifiers 220. For radiation hardness robustness, in the example illustrated in FIG. 5A, the A/C peak detector rectifiers 216, 218, 220 are implemented using passive components. One example of the passive A/C peak detector rectifiers 216, 218, 220 is shown in FIG. 6.

Figure 1:
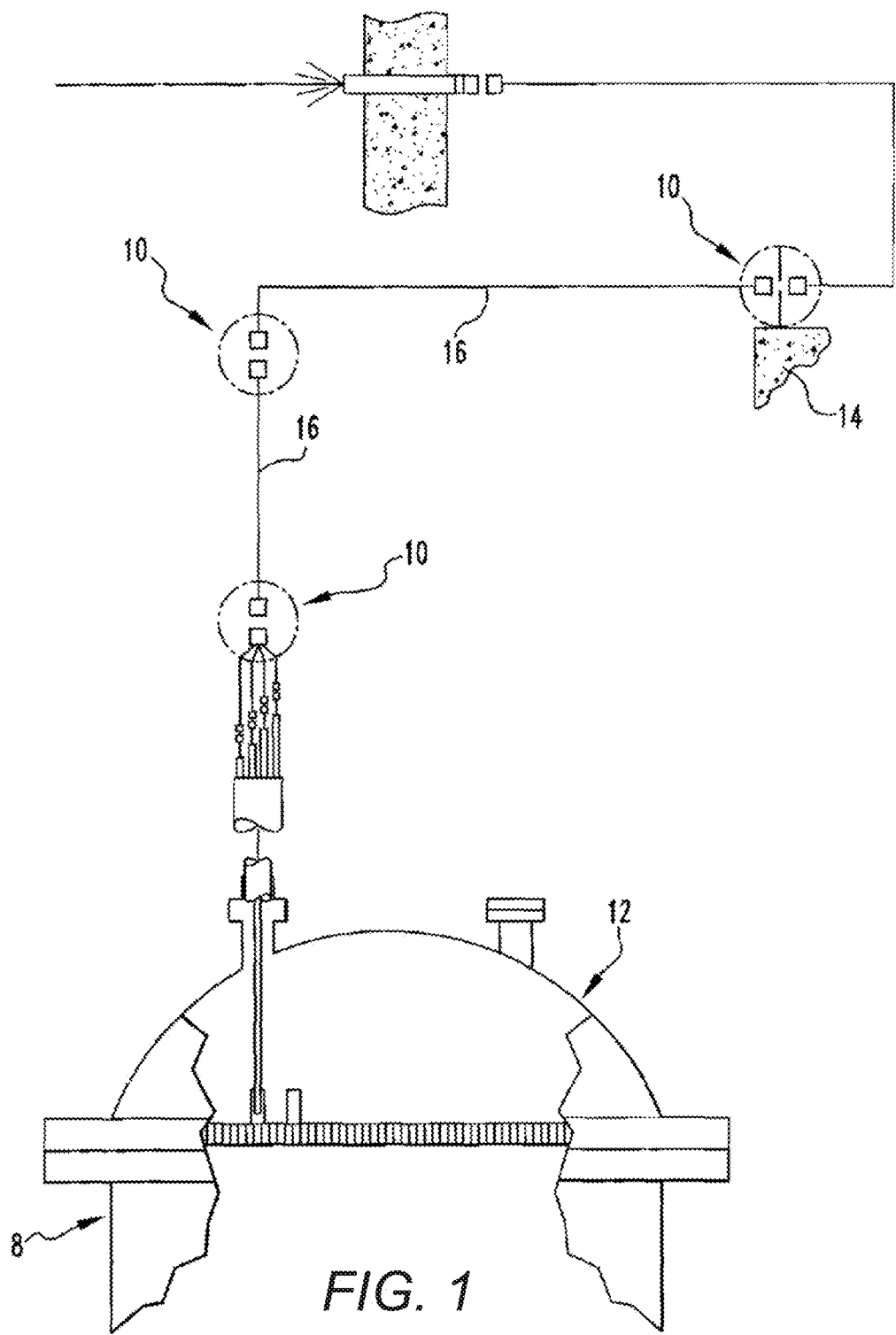
FIG. 1 shows a schematic view of a known system for monitoring the condition of a nuclear reactor vessel.
Figure 2:
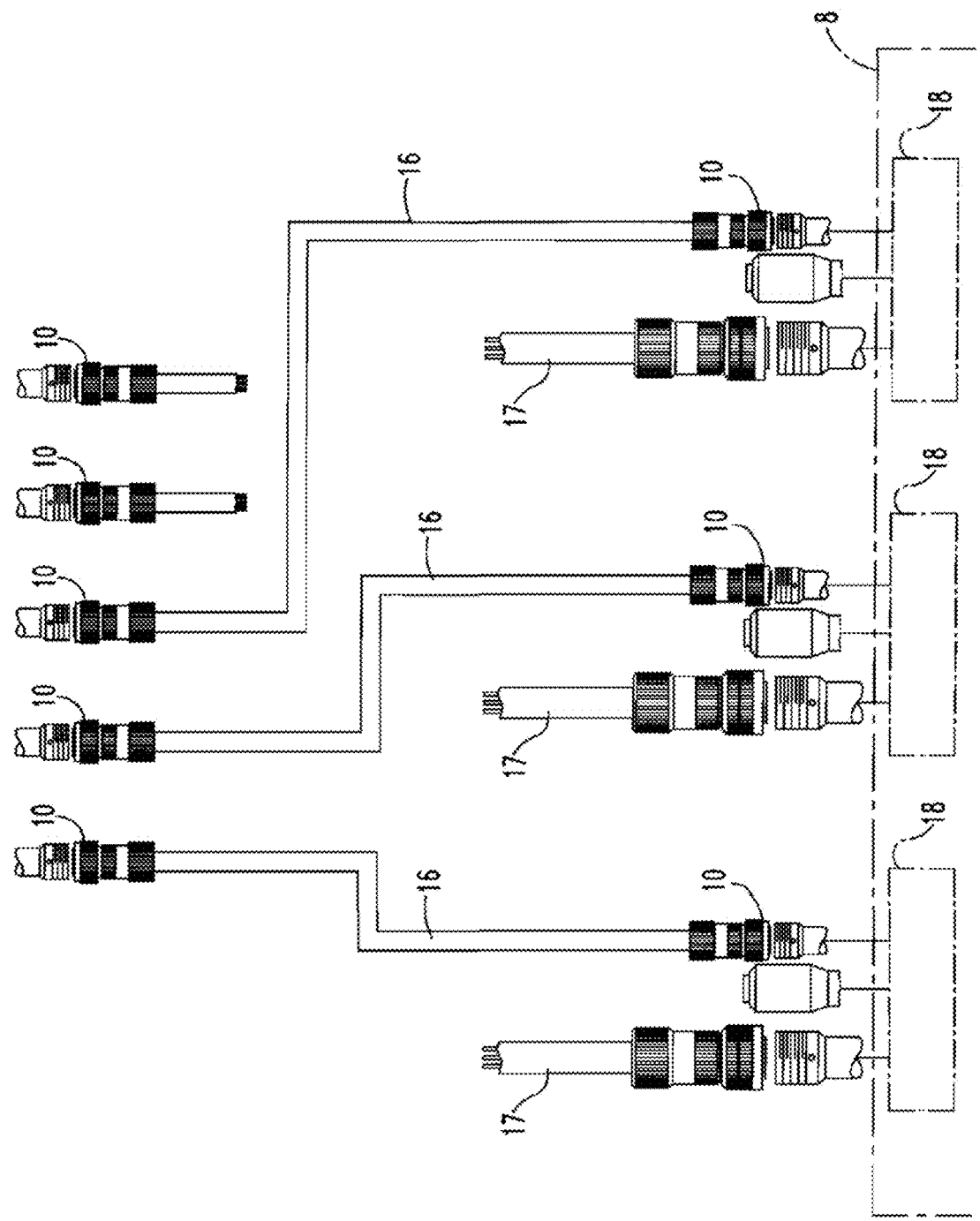
FIG. 2 shows a more detailed schematic view of a portion of the system shown in FIG.

Returning now to FIG. 5A, each coil voltage 210, 212, 214 is rectified from a 50 Hz or 60 Hz AC voltage to its peak DC voltage. The data acquisition system outside of the containment structure is capable of reading AC voltage, however, it will be sampling at a fast enough rate that it may not read the peak voltages consistently. Therefore, the coil voltages 210, 212, 214 rectify the AC voltage to its peak DC value. With reference also to FIG. 6, one example of a passive A/C peak detector rectifier circuit 300 is representative of the passive A/C peak detector rectifiers 216, 218, 220. The passive A/C peak detector rectifier circuit 300 comprised a diode D1-1, appropriately sized capacitor C1 and resistor C1. It will be appreciated that other rectifier circuits may be employed, such as operational amplifier based rectifier circuits, however, such operational amplifier based rectifier circuits must be radiation hardened in order to provide a viable option. The simple passive A/C peak detector rectifier circuit 300 can perform adequately in a high radiation environment that exists on top of the reactor vessel head 12 (FIGS. 1 and 3).

With reference primarily to FIG. 5A and also to FIG. 5B, once each coil voltage 210, 212, 214 is rectified, it is fed to a 32 channel analog multiplexer 222, 224. Each coil stack which have its own multiplexer. All 21 coil voltages 210, 212, 214 will be wired to the first 21 channels of that analog multiplexer 222, 224. The outputs 226, 230 of each coil stack analog multiplexer 222, 224 is provided from the multiplexer circuit 202 to the communications circuit 204 (FIG. 5B). For example, the output 226 of the multiplexer circuit 202 labeled Card #1 Out is provided to the Card #1 input 232 of the communication circuit 204. Selector bits for each analog multiplexer 222, 224 is received from the Mux Sel #1 input 244 of the communications circuit 204 by the multiplexer select input 228 of the multiplexer circuit 202. In the example illustrated in FIG. 5A, five selector bits A0, A1, A2, A3, A4 are used to select one of the 21 coil voltages 210, 212, 214 as inputs to the analog multiplexers 222, 224.

Since each multiplexer circuit 202 will be able to handle 4 DRPI stacks, the multiplexer circuit 202 will contain eight total multiplexers. Each coil stack will have its own analog multiplexer 222 and an isolated redundant multiplexer 224. Also, each coil voltage 210, 212, 214 will have a redundant rectifier circuit 216, 218, 220 (see also A/C peak detector rectifier circuit 300 in FIG. 6) for a total of 168 rectifier circuits.

In one aspect, the multiplexer 22, 224 may be a radiation hardened multiplexer part number ISL71831SEH by Renesas/Intersil, which is rated as a 75 krad TID (total ionizing dose) for a low dose rate. Another suitable radiation hardened analog multiplexer 222, 224 is a radiation hardened multiplexer part number ISL71841SEH by Renesas/Intersil, which is rated at 100 krad TID, among additional features. It will be appreciated that the analog multiplexers 222, 224 may be implemented using any suitable radiation hardened multiplexer and the specific components described in the present disclosure are provided as examples without limitation.

Communication Card

With reference now primarily to FIG. 5B and also to FIGS. 5A and 5C, the communication circuit 204 is the interface between the multiplexer circuit 202 and the data processing unit 114 located outside the containment structure. All the digital outputs that control the analog multiplexers 222, 224 in the multiplexer circuit 202 will be received on the communication circuit 204, then distributed out to the multiplexer circuit 202.

With continued reference to FIGS. 5A-C, the communication circuit 204 comprises three 32 channel analog multiplexers 246, 248, 250. Two of the analog multiplexers 246, 248 receive the output voltage from each DRPI stack multiplexer such as the multiplexer 222 (FIG. 5A). Therefore reducing 64 analog multiplexers down to 2 outputs. The third analog multiplexer 250 will reduce the other two analog multiplexers 246, 248 down to a single output 254, which is provided to the Analog Voltage Input 1 of the data processing unit 114 located outside the containment structure. The third analog multiplexer 250 will only have 2 of the 32 input channels used, but for simplicity and part availability the same integrated circuit is used.

Selector bits A0, A1, A2, A3, A4 for the first and second analog multiplexers 246, 248 on the communication circuit 204 are received by the Mux Sel #2 Input 252 from the data processing unit 114. The analog multiplexer select bits A0, A1, A2, A3, A4 for the analog multiplexers 222, 224 on the multiplexer circuit 202 are received by the Mux Sel #1 Input 256 from the data processing unit 114.

Data Acquisition Computer System

With reference now primarily to FIG. 5C and also to FIGS. 3, 5A, and 5B, The data processing unit 114 is located outside the containment structure. The data processing unit 114 comprises a processor 128 coupled to a memory 130 which also contains executable software instructions 132 to calculate the position of the control rods 102, 104 based on the coil voltages 210, 212, 214. The software instructions 132 also enable the processor 128 to control the selection of the analog multiplexers 222, 224 in the multiplexer circuit 202 and the analog multiplexers 246, 248, 250 in the communication circuit 204.

Data Cabinet Layout and Design

With reference now to FIGS. 3-5C, the two data cabinets A, B comprising the transformer, interface, multiplexer circuit 202, and communication circuit 204 will be mounted on the head of the nuclear reactor vessel head 12. In one aspect, the individual circuits located in the data cabinets A, B, such as the interface circuit, multiplexer circuits 202, and communication circuits 204, are modular so that they can be single or double stacked in the data cabinet A, B enclosures. This allows for the data cabinet A, B enclosures to be different sizes depending on the application while still using the same electronics.

Figure 7:
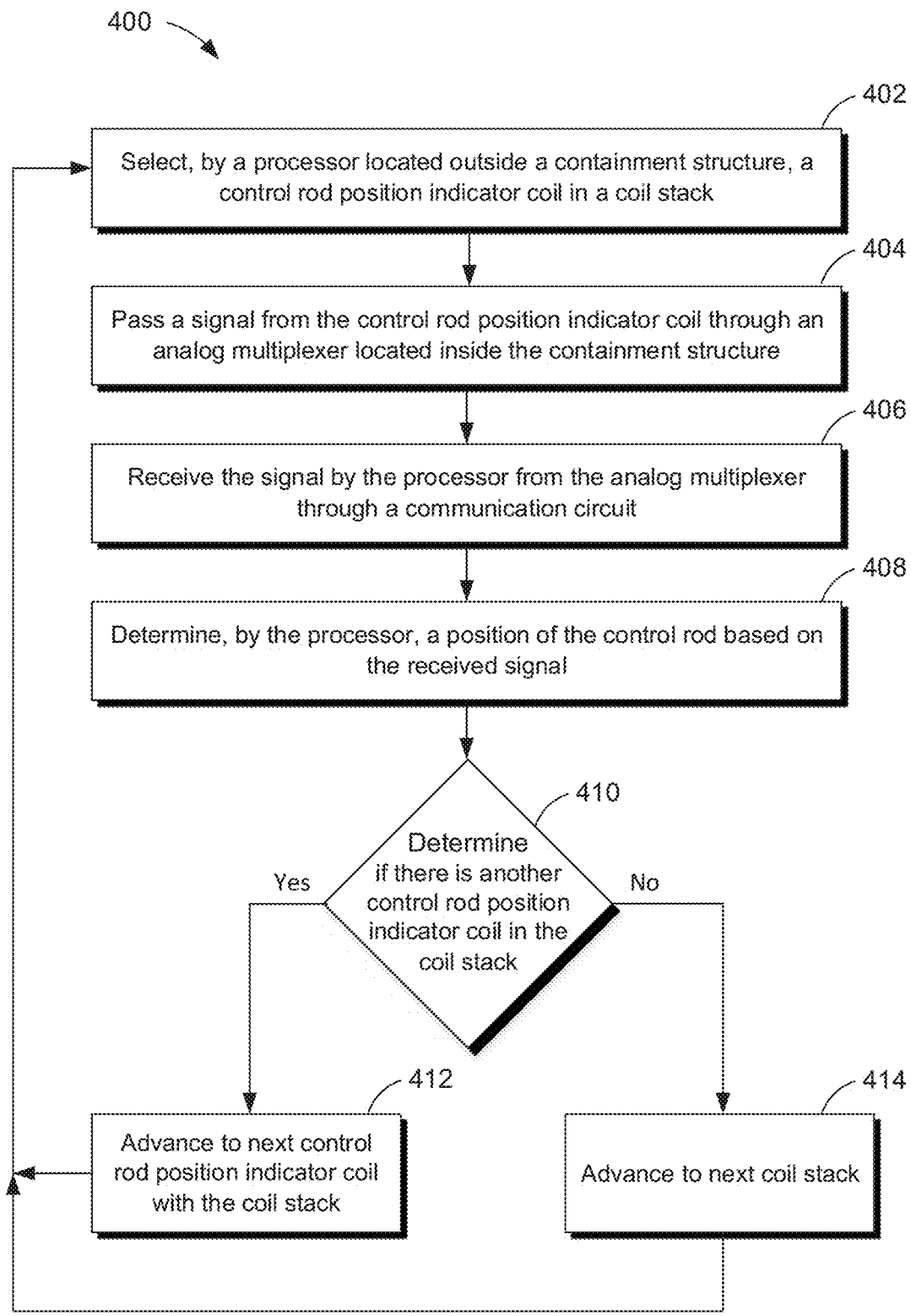
FIG. 7 shows a method of monitoring a position of a control rod disposed in a nuclear reactor vessel disposed in a radioactive environment according to at least one aspect of the present disclosure.

FIG. 7 shows a method 400 of monitoring a position of a control rod disposed in a nuclear reactor vessel 8 disposed in a radioactive environment according to at least one aspect of the present disclosure. The method 400 is implemented in the hardware architecture shown in FIGS. 3-6. An AC voltage is applied to the each control rod position indicator coil 110, 112 in each coil stack 106, 108. According to the method 400, the processor 128 located outside the containment structure selects 402 a control rod position indicator coil 110 arranged in a coil stack 106 through the analog multiplexer 138 located in the data cabinet A mounted on a nuclear reactor vessel head 12 inside the containment structure. The coil stack 106 is positioned proximate a control rod 102 disposed in the nuclear reactor vessel 8. A signal from the control rod position indicator coil 110 is passed 404 through the analog multiplexer 138. The signal from the analog multiplexer 138 is received 406 the by the processor 128 through the communication circuit 204. The processor 128 determines 408 a position of the control rod 102 based on the received signal.

Still with reference to FIG. 7, according to the method 400, the processor 128 determines 410 if there is another control rod position indicator coil 110 in the coil stack 106. If there is another control rod position indicator coil 110 in the coil stack 106, the method 400 proceeds along the "Yes" branch and the processor 128 advances 412 to the next control rod position indicator coil 110 in the coil stack 106 and repeats the selecting 402, passing 404, sending 406, and determining 408 functions until all control rod position indicator coils 110 in the coil stack 106 are selected and read.

If there are no more control rod position indicator coil 110 in the coil stack 106, the method 400 proceeds along the "No" branch and the processor 128 advances 414 to the next coil stack 108 and repeats the selecting 402, passing 404, sending 406, and determining 408 functions until all control rod position indicator coils 110 in the coil stack 106 are selected and read.

In one aspect, the method 400 may repeat indefinitely by sampling all coils 110, 112 in all coil stacks 106, 108 in the nuclear reactor vessel 8. In other aspects, the method 400 may be modified to sample any combination of coils 110, 112 in the coil stacks 106, 108 including monitoring a single coil, which may be useful for drop testing the control rod 102, 104, for example. As discussed above, there may be up to 21 control rod position indicator coils 110, 112 per coil stack 106, 108, and there may be up to 69 control rods 102, 104 in a nuclear reactor vessel 8.

In one aspect, the signal according to the method 400 is a voltage and the method comprises reading a voltage signal from the selected control rod position indicator coil 110, 112. The method 400 further comprises rectifying the voltage read from each of the control rod position indicator coils 100, 112. According to the method 400, the processor 128 determines 408 a position of the control rod 102 based on the received voltage signal and in other aspects, and processor 128 then determines a position of the control rod 102 based on the received rectified voltage signal.

In other aspects, the signal may be resistance, current, or other electrical parameter associated with the control rod position indicator coils 110, 112 in each coil stack 106, 108. Accordingly, the method 400 comprises reading resistance, current, or other electrical parameter associated with the control rod position indicator coils 110, 112 in each coil stack 106, 108 and the processor 128 determines a position of the control rod based on the received resistance, current, or other electrical parameter associated with the control rod position indicator coils 110, 112 in each coil stack 106, 108, and combinations thereof.

The method 400, further comprises routing signals through additional analog multiplexers in a communication circuit 204 located inside the containment structure that interfaces the analog multiplexers 138, 140 with the data processing unit 114 located outside the containment structure.

EXAMPLES

Various aspects of the subject matter described herein are set out in the following examples.

Example 1

A method of monitoring a position of a control rod disposed in a nuclear reactor vessel disposed in a radioactive environment, the method comprising: (a) selecting, by a processor located outside a containment structure, a control rod position indicator coil arranged in a coil stack through an analog multiplexer located in a data cabinet mounted on a nuclear reactor vessel head inside the containment structure, wherein the coil stack is located proximate to a control rod disposed in the nuclear reactor vessel; (b) passing, through the analog multiplexer, a signal from the control rod position indicator coil; (c) receiving, by the processor, the signal from the analog multiplexer through a communication circuit located in the data cabinet mounted on the nuclear reactor vessel head inside the containment structure; and (d) determining, by the processor, a position of the control rod based on the received signal.

Example 2

The method of Example 1, further comprising determining if there is another control rod position indicator coil in the coil stack.

Example 3

The method of Example 2, further comprising: selecting, by the processor, to a new control rod position indicator coil in the coil stack, if there is another control rod position indicator coil in the coil stack; and repeating (b)-(d) for all control rod position indicator coils in the coil stack.

Example 4

The method of any one or more of Examples 2-3, further comprising: selecting, by the processor, to a new coil stack, if there are no more control rod position indicator coils in the coil stack; and repeating (b)-(d) for all control rod position indicator coils in the new coil stack.

Example 5

The method of Example 4, further comprising repeating (a)-(d) for all coil stacks in the nuclear reactor vessel indefinitely.

Example 6

The method of any one or more of Examples 1-5, wherein the signal is a voltage, the method further comprising rectifying, by a passive A/C peak detector rectifier circuit, the voltage signal, wherein the passive A/C peak detector rectifier circuit is located inside the containment structure.

Example 7

The method of any one or more of Examples 1-6, further comprising routing signals through additional analog multiplexers in the communication circuit.

Example 8

An apparatus for monitoring a position of a control rod disposed in a nuclear reactor vessel disposed in a radioactive environment, the apparatus comprising: a processor coupled to a memory storing executable instructions, the processor located outside a containment structure; an analog multiplexer located in a data cabinet mounted on a nuclear reactor vessel head inside the containment structure; and a communication circuit coupled to the analog multiplexer and the processor; wherein when executed by the processor the executable instructions cause the processor to: (a) select a control rod position indicator coil arranged in a coil stack through the analog multiplexer, wherein the coil stack is located proximate to a control rod disposed in the nuclear reactor vessel; (b) pass a signal from the control rod position indicator coil through the analog multiplexer; (c) receive the signal from the analog multiplexer through the communication circuit; and (d) determine a position of the control rod based on the received signal.

Example 9

The apparatus of Example 8, wherein when executed by the processor the executable instructions cause the processor to determine if there is another control rod position indicator coil in the coil stack.

Example 10

The apparatus of Example 9, wherein when executed by the processor the executable instructions cause the processor to: select a new control rod position indicator coil in the coil stack, if there is another control rod position indicator coil in the coil stack; and repeat (b)-(d) for all control rod position indicator coils in the coil stack.

Example 11

The apparatus of any one or more of Examples 9-10, wherein when executed by the processor the executable instructions cause the processor to: select a new coil stack, if there are no more control rod position indicator coils in the coil stack; and repeat (b)-(d) for all control rod position indicator coils in the new coil stack.

Example 12

The apparatus of Example 11, wherein when executed by the processor the executable instructions cause the processor to repeat (a)-(d) for all coil stacks in the nuclear reactor vessel indefinitely.

Example 13

The apparatus of any one or more of Examples 8-12, wherein the signal is a voltage, the apparatus further comprising a passive A/C peak detector rectifier circuit to rectify the voltage signal, wherein the passive A/C peak detector rectifier circuit is located inside the containment structure.

Example 14

The apparatus of any one or more of Examples 8-13, wherein the communication circuit further comprises an analog multiplexer to route signals through the communication circuit to the processor.

Example 15

A system for monitoring a position of a control rod disposed in a nuclear reactor vessel disposed in a radioactive environment, the system comprising: a data processing unit located outside a containment structure, the data processing unit comprising a processor coupled to a memory storing executable instructions; a nuclear reactor vessel located inside the containment structure; a plurality of control rods disposed in the nuclear reactor vessel; a coil stack comprising a plurality of control rod position indicator coils, wherein the coil stack is located proximate to the control rod disposed in the nuclear reactor vessel; a data cabinet mounted on the nuclear reactor vessel head inside the containment structure, the data cabinet comprising: an analog multiplexer; and a communication circuit coupled to the analog multiplexer and the processor; wherein when executed by the processor the executable instructions cause the processor to: (a) select a control rod position indicator coil arranged in a coil stack through the analog multiplexer; (b) pass a signal from the control rod position indicator coil through the analog multiplexer; (c) receive the signal from the analog multiplexer through the communication circuit; and (d) determine a position of the control rod based on the received signal.

Example 16

The system of Example 15, wherein when executed by the processor the executable instructions cause the processor to determine if there is another control rod position indicator coil in the coil stack.

Example 17

The system of Example 16, wherein when executed by the processor the executable instructions cause the processor to: select a new control rod position indicator coil in the coil stack, if there is another control rod position indicator coil in the coil stack; and repeat (b)-(d) for all control rod position indicator coils in the coil stack.

Example 18

The system of any one or more of Examples 16-17, wherein when executed by the processor the executable instructions cause the processor to: select a new coil stack, if there are no more control rod position indicator coils in the coil stack; and repeat (b)-(d) for all control rod position indicator coils in the new coil stack.

Example 19

The system of Example 18, wherein when executed by the processor the executable instructions cause the processor to repeat (a)-(d) for all coil stacks in the nuclear reactor vessel indefinitely.

Example 20

The system of any one or more of Examples 15-19, wherein the signal is a voltage, the apparatus further comprising a passive A/C peak detector rectifier circuit to rectify the voltage signal, wherein the passive A/C peak detector rectifier circuit is located inside the containment structure.

Example 21

The system of any one or more of Examples 15-20, wherein the communication circuit further comprises an analog multiplexer to route signals through the communication circuit to the processor.

While specific aspects of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of which is to be given the full breadth of the claims appended and any and all equivalents thereof.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A method of monitoring a position of a control rod disposed in a nuclear reactor vessel disposed in a radioactive environment, the method comprising:
   (a) selecting, by a processor located outside a containment structure, a control rod position indicator coil arranged in a coil stack through an analog multiplexer located in a data cabinet mounted on a nuclear reactor vessel head inside the containment structure, wherein the coil stack is located proximate to a control rod disposed in the nuclear reactor vessel;
   (b) passing, through the analog multiplexer, an analog signal from the control rod position indicator coil;
   (c) receiving, by the processor, the analog signal from the analog multiplexer through a communication circuit located in the data cabinet mounted on the nuclear reactor vessel head inside the containment structure; and
   (d) determining, by the processor, a position of the control rod based on the received analog signal.

2. The method of claim 1, further comprising determining if there is another control rod position indicator coil in the coil stack.

3. The method of claim 2, further comprising:
selecting, by the processor, to a new control rod position indicator coil in the coil stack, if there is another control rod position indicator coil in the coil stack; and
repeating (b)-(d) for all control rod position indicator coils in the coil stack.

4. The method of claim 2, further comprising:
selecting, by the processor, to a new coil stack, if there are no more control rod position indicator coils in the coil stack; and
repeating (b)-(d) for all control rod position indicator coils in the new coil stack.

5. The method of claim 4, further comprising repeating (a)-(d) for all coil stacks in the nuclear reactor vessel indefinitely.

6. The method of claim 1, wherein the analog signal is a voltage, the method further comprising rectifying, by a passive A/C peak detector rectifier circuit, the voltage signal, wherein the passive A/C peak detector rectifier circuit is located inside the containment structure.

7. The method of claim 1, further comprising routing signals through additional analog multiplexers in the communication circuit.

8. An apparatus for monitoring a position of a control rod disposed in a nuclear reactor vessel disposed in a radioactive environment, the apparatus comprising:
a processor coupled to a memory storing executable instructions, the processor located outside a containment structure;
an analog multiplexer located in a data cabinet mounted on a nuclear reactor vessel head inside the containment structure; and
a communication circuit coupled to the analog multiplexer and the processor;
wherein when executed by the processor the executable instructions cause the processor to:
(a) select a control rod position indicator coil arranged in a coil stack through the analog multiplexer, wherein the coil stack is located proximate to a control rod disposed in the nuclear reactor vessel;
(b) pass an analog signal from the control rod position indicator coil through the analog multiplexer;
(c) receive the analog signal from the analog multiplexer through the communication circuit; and
(d) determine a position of the control rod based on the received analog signal.

9. The apparatus of claim 8, wherein when executed by the processor the executable instructions cause the processor to determine if there is another control rod position indicator coil in the coil stack.

10. The apparatus of claim 9, wherein when executed by the processor the executable instructions cause the processor to:
select a new control rod position indicator coil in the coil stack, if there is another control rod position indicator coil in the coil stack; and
repeat (b)-(d) for all control rod position indicator coils in the coil stack.

11. The apparatus of claim 9, wherein when executed by the processor the executable instructions cause the processor to:
select a new coil stack, if there are no more control rod position indicator coils in the coil stack; and
repeat (b)-(d) for all control rod position indicator coils in the new coil stack.

12. The apparatus of claim 11, wherein when executed by the processor the executable instructions cause the processor to repeat (a)-(d) for all coil stacks in the nuclear reactor vessel indefinitely.

13. The apparatus of claim 8, wherein the analog signal is a voltage, the apparatus further comprising a passive A/C peak detector rectifier circuit to rectify the voltage signal, wherein the passive A/C peak detector rectifier circuit is located inside the containment structure.

14. The apparatus of claim 8, wherein the communication circuit further comprises an analog multiplexer to route signals through the communication circuit to the processor.

15. A system for monitoring a position of a control rod disposed in a nuclear reactor vessel disposed in a radioactive environment, the system comprising:
a data processing unit located outside a containment structure, the data processing unit comprising a processor coupled to a memory storing executable instructions;
a nuclear reactor vessel located inside the containment structure;
a plurality of control rods disposed in the nuclear reactor vessel;
a coil stack comprising a plurality of control rod position indicator coils, wherein the coil stack is located proximate to the control rod disposed in the nuclear reactor vessel;
a data cabinet mounted on the nuclear reactor vessel head inside the containment structure, the data cabinet comprising:
an analog multiplexer; and
a communication circuit coupled to the analog multiplexer and the processor;
wherein when executed by the processor the executable instructions cause the processor to:
(a) select a control rod position indicator coil arranged in a coil stack through the analog multiplexer;
(b) pass an analog signal from the control rod position indicator coil through the analog multiplexer;
(c) receive the analog signal from the analog multiplexer through the communication circuit; and
(d) determine a position of the control rod based on the received analog signal.

16. The system of claim 15, wherein when executed by the processor the executable instructions cause the processor to determine if there is another control rod position indicator coil in the coil stack.

17. The system of claim 16, wherein when executed by the processor the executable instructions cause the processor to:
select a new control rod position indicator coil in the coil stack, if there is another control rod position indicator coil in the coil stack; and
repeat (b)-(d) for all control rod position indicator coils in the coil stack.

18. The system of claim 16, wherein when executed by the processor the executable instructions cause the processor to:
select a new coil stack, if there are no more control rod position indicator coils in the coil stack; and
repeat (b)-(d) for all control rod position indicator coils in the new coil stack.

19. The system of claim 18, wherein when executed by the processor the executable instructions cause the processor to repeat (a)-(d) for all coil stacks in the nuclear reactor vessel indefinitely.

20. The system of claim 15, wherein the analog signal is a voltage, the apparatus further comprising a passive A/C peak detector rectifier circuit to rectify the voltage signal, wherein the passive A/C peak detector rectifier circuit is located inside the containment structure.

21. The system of claim 15, wherein the communication circuit further comprises an analog multiplexer to route signals through the communication circuit to the processor.

* * * * *